United States Patent
Manger et al.

(10) Patent No.: US 10,760,637 B2
(45) Date of Patent: Sep. 1, 2020

(54) ADJUSTABLE DAMPING VALVE DEVICE

(71) Applicant: ZF Friedrichshafen AG

(72) Inventors: Thomas Manger, Wasserlosen (DE);
Lukas Ruhmann, Gremsdorf (DE);
Stefan Schmitt, Gochsheim (DE)

(73) Assignee: ZF Friedrichshafen AG,
Friedrichshafen (DE)

( * ) Notice: Subject to any disclaimer, the term of this patent is extended or adjusted under 35 U.S.C. 154(b) by 164 days.

(21) Appl. No.: 15/540,300

(22) PCT Filed: Dec. 15, 2015

(86) PCT No.: PCT/EP2015/079697
§ 371 (c)(1),
(2) Date: Jun. 28, 2017

(87) PCT Pub. No.: WO2016/113056
PCT Pub. Date: Jul. 21, 2016

(65) Prior Publication Data
US 2018/0003259 A1    Jan. 4, 2018

(30) Foreign Application Priority Data

Jan. 13, 2015 (DE) .......................... 10 2015 200 348

(51) Int. Cl.
*F16F 9/46* (2006.01)
*F16F 9/34* (2006.01)
*F16K 31/06* (2006.01)

(52) U.S. Cl.
CPC ................ *F16F 9/464* (2013.01); *F16F 9/34* (2013.01); *F16F 9/46* (2013.01); *F16K 31/0679* (2013.01); *F16F 2228/066* (2013.01); *F16F 2230/24* (2013.01)

(58) Field of Classification Search
None
See application file for complete search history.

(56) References Cited

U.S. PATENT DOCUMENTS

| | | | |
|---|---|---|---|
| 5,398,787 A | * | 3/1995 | Woessner ............... B60G 17/08 188/266.6 |
| 5,413,196 A | | 5/1995 | Foerster |
| 5,860,631 A | | 1/1999 | Feigel |
| 8,485,224 B2 | | 7/2013 | Foerster |
| 9,297,437 B2 | | 3/2016 | Foerster |
| 9,310,810 B2 | | 4/2016 | Foerster |

(Continued)

FOREIGN PATENT DOCUMENTS

JP        2014156884 A  *  8/2014    .............. F16F 9/465

OTHER PUBLICATIONS

JP-2014156884-A, JPO, Translation 2019 (Year: 2019).*

*Primary Examiner* — Daphne M Barry
(74) *Attorney, Agent, or Firm* — Cozen O'Connor

(57) ABSTRACT

An adjustable damping valve device for a vibration damper, includes a main stage valve which is controlled by a pre-stage valve with a pre-stage valve body, which pre-stage valve can be actuated by an electromagnetic actuator, wherein an emergency operation valve controls the main stage valve during emergency operation, wherein an emergency operation armature is preloaded on the pre-stage valve body of the pre-stage valve by an emergency operation spring so that the pre-stage valve forms the emergency operation valve.

12 Claims, 2 Drawing Sheets

(56) References Cited

U.S. PATENT DOCUMENTS

| | | | |
|---|---|---|---|
| 9,618,138 B2* | 4/2017 | Manger | F16F 9/3481 |
| 10,060,543 B2* | 8/2018 | Manger | F16F 9/14 |
| 2013/0015028 A1 | 1/2013 | Foerster | |
| 2016/0003320 A1* | 1/2016 | Kamakura | F16F 9/465 |
| | | | 251/30.02 |
| 2017/0314634 A1* | 11/2017 | Manger | F16F 9/464 |
| 2018/0355940 A1* | 12/2018 | Manger | F16F 9/062 |
| 2019/0136937 A1* | 5/2019 | Kess | F16F 9/464 |

* cited by examiner

ADJUSTABLE DAMPING VALVE DEVICE

PRIORITY CLAIM

This is a U.S. national stage of application No. PCT/EP2015/079697, filed on Dec. 15, 2015. Priority is claimed on the following application(s): Country: Germany, Application No.: 10 2015 200 348.5, filed: Jan. 13, 2015, the content of which is/are incorporated herein by reference in its entirety.

FIELD OF THE INVENTION

The invention is directed to an adjustable damping valve device with an emergency operation function.

BACKGROUND OF THE INVENTION

An adjustable damping valve device comprising a pre-stage valve and a main stage valve is known from U.S. Pat. No. 9,297,437. Further, an emergency operation valve which occupies an emergency operation position during an outage of the power supply for an actuator of the damping valve device is connected in series with the pre-stage valve. At least one pressure relief valve which opens in the event of overpressure in a control space of the damping valve device and accordingly determines a maximum damping force setting is in turn connected in parallel with the emergency operation valve. Accordingly, the damping valve device comprises at least four individual valves which must be adapted to one another and which require a substantial manufacturing effort.

The emergency operation valve comprises an annular emergency operation valve body which is preloaded by an emergency operation valve spring on a valve seat surface which is separate with respect to the pre-stage valve.

U.S. Pat. No. 9,310,810 discloses an alternative solution. The at least one pressure relief valve is likewise arranged in the emergency operation valve. For this reason, small pressure relief valves which screw into the emergency operation valve, for example, can be provided taking into account the required installation space. Pressure relief valves of this kind are available as modular units and are comparatively inexpensive. However, owing to the small construction, they are comparatively sensitive with respect to manufacturing tolerances, e.g., in the closing spring. While this problem can be compensated with an adjustable supporting surface for the closing spring, the achievable volume flows through an individual pressure relief valve are comparatively small. Consequently, a plurality of pressure relief valves must be provided, which increases assembly costs.

It is thus an object of the present invention to provide an adjustable damping valve device with an emergency operation function which has a simpler overall construction compared with the prior art.

SUMMARY OF THE INVENTION

This object is met in that an emergency operation armature is preloaded on the pre-stage valve body of the pre-stage valve by an emergency operation spring so that the pre-stage valve forms the emergency operation valve.

The advantage consists in that two valves, namely the previous emergency operation valve and at least one pressure relief valve, can be dispensed with through the dual function of pre-stage valve and emergency operation valve.

Aside from the expenditure on construction, an advantage can also be achieved with respect to axial installation space.

In order to minimize any manufacturing inaccuracies, the emergency operation armature is supported peripherally on a cover surface of the pre-stage valve body. The larger the contact circle between the emergency operation armature and the pre-stage valve body, the smaller the effects of dimensional errors.

In a further advantageous embodiment, the cover surface has a stepped profile with a stepped contact surface for the emergency operation armature. The machining expenditure is reduced as a result of this geometry because only a small proportion of the surface need be produced with precision.

Alternatively or in conjunction, the emergency operation armature can have a stepped support surface in direction of the cover surface of the pre-stage valve body.

The support surface preferably has a knife edge geometry. The knife edge geometry aims at a line contact between the emergency operation armature and the pre-stage valve body so that an angular error between the emergency operation armature and the pre-stage valve body can easily be compensated.

To promote the efficiency of movement of the emergency operation armature, the latter has a flow connection which connects two spaces of the damping valve device which are separated from one another by the emergency operation armature. Accordingly, no hydraulically closed spaces can be formed which could cause negative pressure or a backup pressure.

For example, the emergency operation armature can have at least one notch channel in the area of the support surface. This does not compromise the strength of the emergency operation armature.

Alternatively, the emergency operation armature can have the at least one flow connection at its outer lateral surface.

BRIEF DESCRIPTION OF THE DRAWINGS

The invention will be described in more detail with reference to the drawings in which.

DETAILED DESCRIPTION OF THE PRESENTLY PREFERRED EMBODIMENTS

Figure 1:
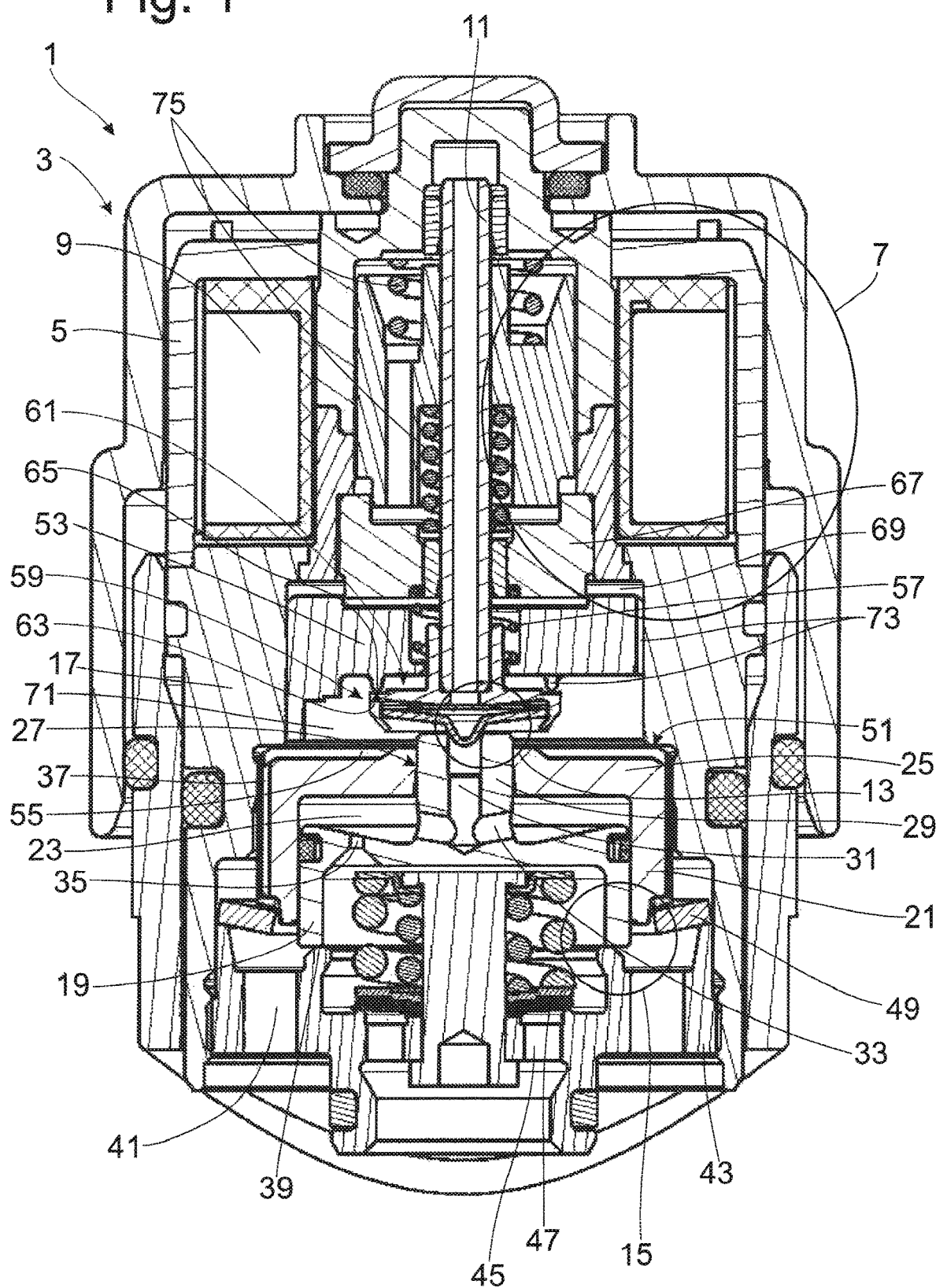
FIG. 1 is a sectional view through a damping valve device of the present invention.

FIG. 1 shows a damping valve device 1 with a damping valve housing 3 for a vibration damper of any constructional type, this damping valve housing 3 being divided in two axially. In the present configuration, the damping valve device 1 is provided for external arrangement with respect to an outer cylinder of the vibration damper, but the construction principle can easily be adapted to a damping valve device, e.g., to a piston rod on a damping valve device. An actuator 7, known per se, which comprises a coil 9 acting on a pre-stage valve 13 via an armature 11 is arranged in a first damping valve housing portion 5. A main stage valve 15 which generates the damping force in the vibration damper is controlled with the pre-stage valve 13. The pre-stage valve 13 and the main stage valve 15 are arranged in the second damping valve housing portion 17 which has a tubular base shape without an intermediate wall.

The main stage valve 15 comprises a main stage valve body 19 which is guided so as to be axially movable in a housing insert 21 which is separate from the damping valve housing 3. The housing insert 21 is constructed in a pot-shaped manner and forms a control space 23 via which the main stage valve 15 is controlled by the pre-stage valve 13. A base 25 of the housing insert 21 has an opening 27 in which a guide shaft 29 of the main stage valve body 19 is guided. Extending in the guide shaft 29 are an axial channel 31 and a transverse channel 33 which connect the control space 23 to the pre-stage valve 13 via a passage 35 in the base 25.

The housing insert 21 has a profiling on the outer side. In this way, opposed surfaces of the damping valve housing 3 and of the housing insert 21 form at least one flow channel 37 for a flow of damping medium inside the damping valve device 1 and, on the outer side, the base 25 has radial channels 55 which transition into the flow channels 37.

The main stage valve 15 is constructed as a seat valve so that the main stage valve body 19 rests on a main stage valve seat surface 39. At least one through-channel 41 which is arranged radially inside of the damping valve housing 3 is formed radially outwardly of the main stage valve seat surface 39. The flow channel 37 present at the outer side of the housing insert 21 is connected to the at least one through-channel 41.

The main stage valve seat surface 39 is in turn formed by a valve insert 43 via which the housing insert 21 is axially positioned in the damping valve housing 3. In the present embodiment form, the valve insert 43 has damping channels 45 which cooperate with at least one valve disk 47. However, this is optional.

The housing insert 21 is preloaded axially against a supporting surface 51 of the damping valve housing 3 by a spring element 49 constructed as a disk spring. The spring element 49 is in turn supported at the valve insert 43.

In principle, a damping valve device 1 would be capable of operating with a main stage valve 15 and a pre-stage valve 13. Particularly in case the actuator 7 can no longer be supplied with power, this adjustable damping valve device 1 has an emergency operation function.

An emergency operation armature 53 is axially moveably guided inside the second damping valve housing portion 17. An emergency operation spring 57 in the form of a compression spring preloads the emergency operation armature 53 on the pre-stage valve body 59 of the pre-stage valve 13. The emergency operation spring 57 is supported at a structural component part which is fixed with respect to the housing, and the emergency operation armature 53 directly contacts a cover surface 61 of the pre-stage valve body 59 peripherally.

The cover surface 61 has a stepped profile with a stepped contact surface 63 for the emergency operation armature 53. The emergency operation armature 53 also has a stepped support surface 65 in direction of the cover surface 61 of the pre-stage valve body 59, which support surface 65 preferably has a knife edge geometry.

The emergency operation armature 53 is spatially arranged between a back-iron 67 of the actuator 7 and the base 25 of the housing insert 21 and accordingly separates two lift or control spaces 69; 71 for the emergency operation armature. So as not to allow a backup pressure to build up in one of the lift spaces 69; 71, the emergency operation armature 53 has at least one flow connection 73 which connects the two separated spaces 69; 71 of the damping valve device 1 to one another.

A flow connection 73 can optionally be carried out in the area of the support surface 65 as notch channel, e.g., in the form of a simple impression. Alternatively, the emergency operation armature can have the flow connection 73 at its outer lateral surface.

In the left-hand section half, the emergency operation armature is comparable to the prior art with respect to the axial structural length. The right-hand section half illustrates the advantage that can be achieved by the present invention with respect to installation space as a result of a narrow emergency operation armature 53.

During a working movement of a vibration damper provided with the damping valve device, damping medium is displaced into the damping valve device 3 via a tube connection of the valve insert 43. In so doing, the damping medium passes the at least one damping channel 45 and the at least one valve disk 47. Accordingly, a lifting force acts on the main stage valve body 19. The damping medium arrives in the control space 23 via passage 35 and accordingly exerts a closing force on the main stage valve body 19. The pre-stage valve 13 controls an outflow cross section out of the control space 23 into the flow channel 37 between housing insert 21 and second damping valve housing portion 17. When the power supply is intact, the emergency operation armature 53 is lifted against the force of the emergency operation spring 57 and the pre-stage valve body 59 is accordingly relieved. The closing force acting on the pre-stage valve body 59 is now only determined by a spring arrangement 75 of the actuator 7 acting on the armature 11 of the pre-stage valve 13. The spring arrangement 75 of the armature 11 and the emergency operation spring 57 are arranged functionally in parallel.

The damping medium flowing out reaches an annular space between the second damping valve housing portion 17 and the valve insert 43 via the radial channels 55 and the flow channel 37, and the damping medium of the pre-stage valve 13 flows out via the at least one passage channel 41 thereof.

When there is disruption of the power supply for the actuator 7, the closing force of the emergency operation spring 57 acts in its entirety via the contact between the emergency operation armature 53 and the pre-stage valve body 59. In sum, the spring forces of the spring arrangement 75 and of the emergency operation spring 57 determine the closing force acting on the pre-stage valve body 59.

The pressure in the axial channel 31 acts in opening direction and allows the pre-stage valve body 59 to be lifted. In so doing, a closing pressure on the main stage valve body 19 arises in the control space 23. Consequently, the pre-stage valve 13 also takes over the emergency operation function during outage of the power supply for the actuator 7.

During a lifting movement of the main stage valve body 19 from its main stage valve seat surface 39, damping medium flows radially outward and likewise flows out of the damping valve housing 3 via the at least one passage channel 41. The damping medium then flows into a compensation space or working space, not shown.

Figure 2:
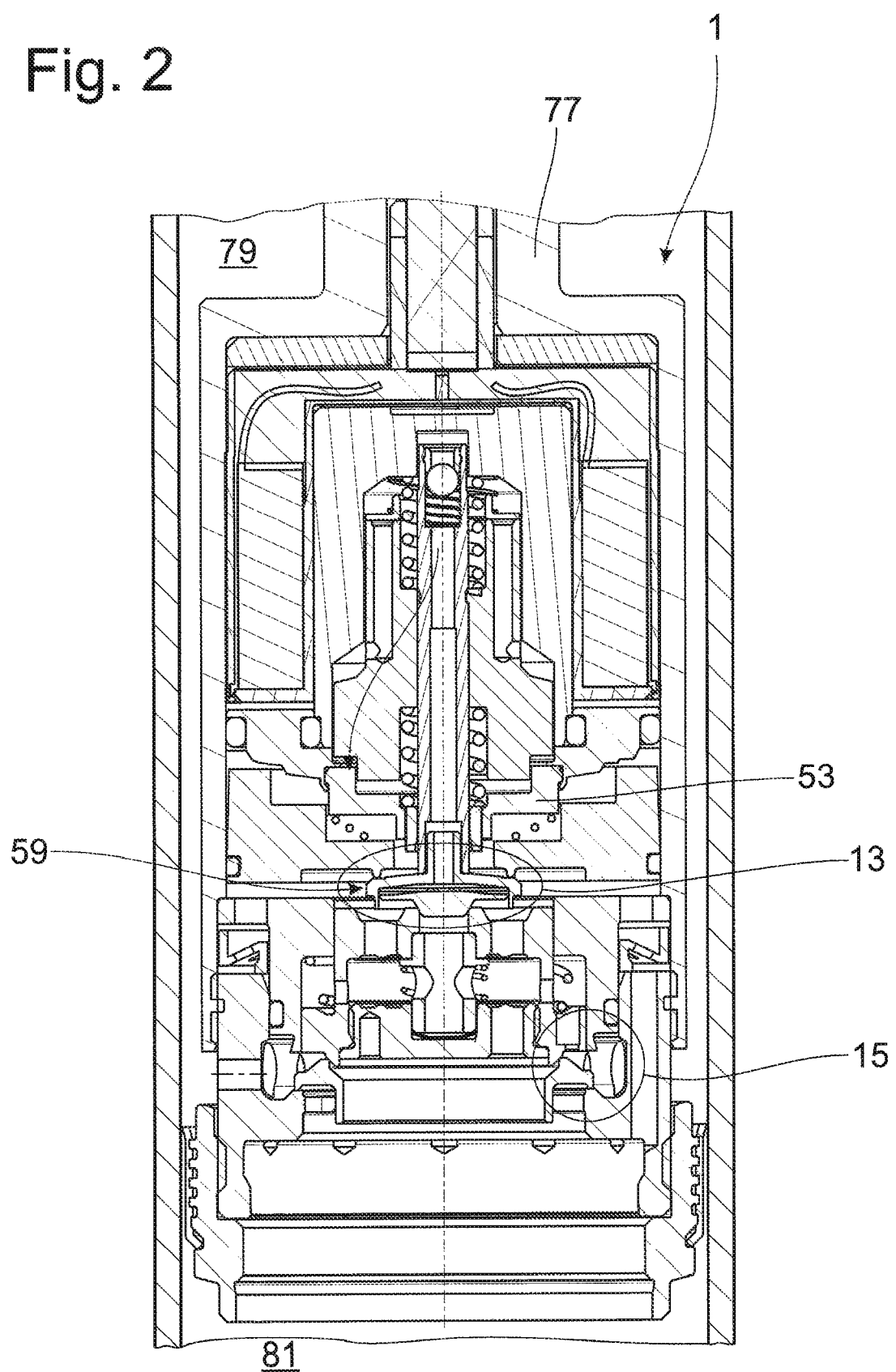
FIG. 2 is a sectional view of a damping valve device of the present invention at a piston rod.

The invention is not limited to use in a damping valve with one-sided throughflow direction. FIG. 2 shows an embodiment of an adjustable damping valve device 1 at a piston rod 77 between two working chambers 79; 81 filled with damping medium. The construction of the pre-stage valve 13 and of the main stage valve 15 are known in detail from U.S. Pat. No. 9,297,437 which is incorporated herein by reference in its entirety In contrast, an emergency operation armature 53 according to FIG. 1 is used, this emergency operation armature 53 is likewise directly supported on the pre-stage valve body 59 which is constructed identically to the construction according to FIG. 1. The pre-stage valve 13 also takes over the function of an emergency operation valve in this construction.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An adjustable damping valve device for a vibration damper comprising:
   a main stage valve having an axially movable main stage valve body and an axially extending channel;
   a pre-stage valve including an axially moveable pre-stage valve body having a first surface facing said axially extending channel in said main stage valve body and a cover surface opposite said first surface and facing away from said axially extending channel and constructed to control said main stage valve;
   an electromagnetic actuator constructed to actuate said pre-stage valve;
   an emergency operation valve constructed to control said main stage valve during an outage of power supplied to the electromagnetic actuator; and
   an emergency operation armature preloaded by an emergency operation spring on said axially moveable pre-stage valve body of said pre-stage valve so that, during the outage of power supply to the electromagnetic actuator, the emergency operation armature is in constant direct contact with said cover surface of said axially moveable pre-stage valve body and so that said pre-stage valve forms said emergency operation value.

2. The adjustable damping valve device according to claim 1, wherein said emergency operation armature is supported peripherally on said cover surface of said pre-stage valve body.

3. The adjustable damping valve device according to claim 2, wherein said cover surface has a stepped profile with a stepped contact surface for said emergency operation armature.

4. The adjustable damping valve device according to claim 2, wherein said emergency operation armature has a stepped support surface in direction of said cover surface of said pre-stage valve body.

5. The adjustable damping valve device according to claim 4, wherein said support surface has a knife edge geometry.

6. The adjustable damping valve device according to claim 5, wherein said emergency operation armature has at least one flow connection which connects two spaces of said damping valve device which are separated from one another by said emergency operation armature.

7. The adjustable damping valve device according to claim 4, wherein said emergency operation armature has at least one flow connection which connects two spaces of said damping valve device which are separated from one another by said emergency operation armature.

8. The adjustable damping valve device according to claim 7, wherein said emergency operation armature has at least one notch channel in the area of said support surface.

9. The adjustable damping valve device according to claim 7, wherein said emergency operation armature of said at least one flow connection is located at an outer lateral surface of said emergency operation armature.

10. The adjustable damping valve device according to claim 1, wherein said emergency operation armature preloaded by said emergency operation spring is axially and sequentially in-line with said pre-stage valve body.

11. The adjustable damping valve device according to claim 1, said pre-stage valve further comprising an armature and a spring arrangement acting on said armature and wherein, during the outage of power supply to the electromagnetic actuator, a closing force acting on said axially movable pre-stage valve body is determined solely by the spring forces of said emergency operation spring and said spring arrangement.

12. The adjustable damping valve device according to claim 1, additionally comprising a housing and a housing insert mounted within said housing, said housing insert having an opening, and said main stage valve body comprising a guide shaft axially movably guided in said opening of said housing insert.

\* \* \* \* \*